United States Patent Office 3,578,638
Patented May 11, 1971

3,578,638
AROMATIC POLY(CARBAMIC-ANHYDRIDE-AMIDE-ESTER) AND A PROCESS FOR PREPARING THE SAME
James C. Fang, Media, Pa., assignor to E. I. du Pont de Nemours and Company, Wilmington, Del.
No Drawing. Continuation-in-part of application Ser. No. 650,196, June 30, 1967. This application Apr. 28, 1970, Ser. No. 32,743
Int. Cl. C08g 20/32
U.S. Cl. 260—77.5    11 Claims

ABSTRACT OF THE DISCLOSURE

A poly(carbamic-anhydride-amide-ester) which is made by polymerizing the mono-ester of trimellitic anhydride and an organic diisocyanate is the subject of this invention. The polymer has the following recurring structural units

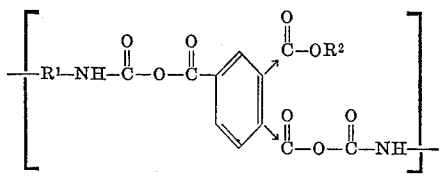

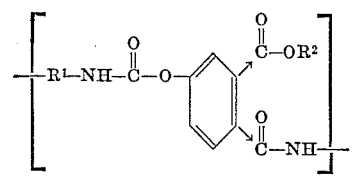

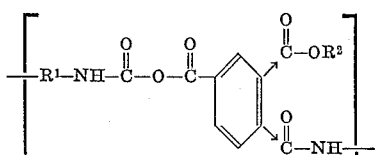

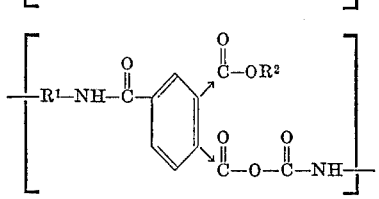

wherein the arrows denote isomerism; $R^1$ is a divalent organic radical having at least two carbon atoms; $R^2$ is selected from the group consisting of an alkyl radical having 1–8 carbon atoms, aryl radical, and a cycloaliphatic radical; and the polymer has an inherent viscosity at 25° C. of at least 0.15 measured at about 0.5% polymer solids in N-methyl pyrrolidone. The polymer can be converted into a polyamide-imide which is useful as durable coatings for metals and electrical conductors; also the polymer can be formed into films or fibers or can be converted into a foam structure.

CROSS-REFERENCE TO RELATED APPLICATIONS

This is a continuation-in-part application to my copending application Ser. No. 650,196, filed June 30, 1967.

BACKGROUND OF THE INVENTION

This invention relates to poly(carbamic-anhydride-amide-esters) and to their preparation. In particular, this invention relates to poly(carbamic-anhydride-amide-esters) formed by reacting the mono-ester of a tricarboxylic anhydride and an organic diisocyanate that can be easily converted into a polyamide-ester or into a polyamide-imide.

Polyamide polymers have been prepared from a dicarboxylic acid and an organic diisocyanate as illustrated in Hanford and Holmes U.S. Pat. 2,284,896, issued June 2, 1942, and these polyamides are very useful for forming fibers, coatings, films and the like. Polyamide-imide foam structures have been prepared from diisocyanates and trimellitic anhydrides as shown in Frey U.S. Pat. 3,300,420, issued Jan. 24, 1967. Sorenson U.S. Pat. 3,312,663, issued Apr. 4, 1967, is directed to polyamide-esters which are shapable and are readily converted into a polyimide polymer. These polyamide-esters are formed by reacting the diester of a tetracarboxylic dianhydride, such as the diester pyromellitic dianhydride with an organic diamine. The novel polymer of this invention is formed from a mono-ester of a tricarboxylic anhydride and an organic diisocyanate and are convertible to a polyamide-ester or to a polyamide-imide. The novel polymer of this invention is useful as a coating composition and can be formed into a foam structure that has excellent stability.

SUMMARY OF THE INVENTION

This invention concerns a novel poly(carbamic-anhydride-amide-ester) and a novel process for making the polymer by reacting a mono-ester of a tricarboxylic anhydride with an organic diisocyanate; the novel polymer has the following recurring units:

(I) 1 to 20% by weight of

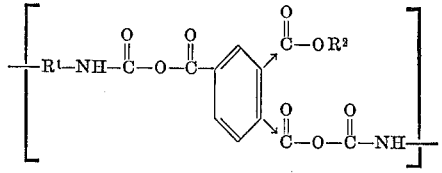

(II) 40 to 95% by weight of

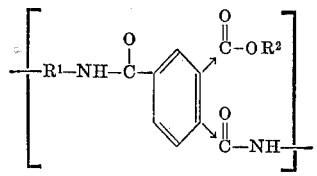

(III) 1 to 20% by weight of

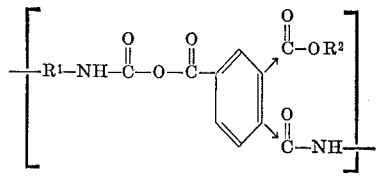

(IV) 1 to 20% by weight of

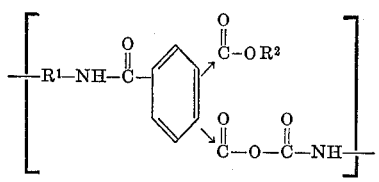

wherein the arrows denote isomerism; $R^1$ is a divalent organic radical having at least two carbon atoms; $R^2$ is selected from the group consisting of an alkyl radical having 1–18 carbon atoms, aryl radical, and a cycloaliphatic radical; and wherein the polymer has an inherent viscosity at 25° C. of at least 0.15 measured at about 0.5% polymer solids in N-methyl pyrrolidone.

DESCRIPTION OF THE INVENTION

Preferably, in the novel polymer of this invention, $R^1$ is an alkylene radical having 2–6 carbon atoms or

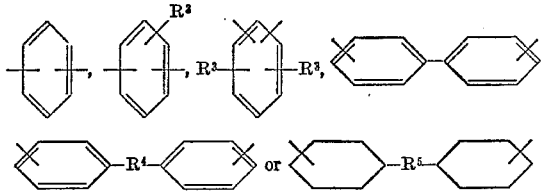

where $R^3$ is an alkyl radical of 1–3 carbon atoms; $R^4$ is and alkylene radical of 1–3 carbon atoms, —O—, —S—, or —SO$_2$—; $R^5$ is an alkylene radical of 1–3 carbon atoms; $R^2$ is either phenyl, cyclohexyl or an alkyl radical of 2–10 carbon atoms; and preferably, the inherent viscosity at 25° C. is 0.15–4, and more preferably, 0.5–2, measured at 0.5% polymer solids in N-methyl pyrrolidone. Also, structural units (I), (II), (III) and (IV) preferably are present in amounts of 3 to 10%, 70 to 90%, 3 to 10%, and 3 to 10% respectively.

Inherent viscosity which is directly related to molecular weight of the polymer is defined as follows:

$$\text{Inherent viscosity} = \frac{\text{Natural logarithm of the relative viscosity}}{C}$$

where the relative viscosity is the ratio of the solution viscosity to the solvent viscosity and C is the concentration of solute in solution measured as grams of polymer per 100 milliliters of solution.

The novel process for producing the novel polymer of this invention comprises forming a mono-ester of an aromatic tricarboxylic anhydride and then reacting this product with an organic diisocyanate. In the esterification of the tricarboxylic anhydride to form the mono-ester, the anhydride, e.g., trimellitic anhydride, and the alcohol for example, n-butanol, are dissolved in a common solvent, such as methylisobutyl ketone, methylethyl ketone, xylene, and the like, and are heated to about 80–160° C. for about ½–3 hours. Preferably, the ingredients are heated to about 100–140° C. for about 1–2 hours to form the mono-ester. An inert solvent, i.e., inert to the reaction, is then added to the esterification product and the organic diisocyanate is then slowly added to the mixture and the mixture is heated to about 25 to 145° C. for about 0.1 to 1.9 hours to form the polymer of this invention. Preferably, the mixture is heated to about 75 to 125° C. for about 0.1 to 0.5 hour. The resulting polymer has an inherent viscosity of at least 0.15 at 25° C. at about 0.5% polymer solids in N-methyl pyrrolidone and preferably, an inherent viscosity of 0.5 to 2.0.

The aromatic tricarboxylic anhydride used in the process of this invention to form the novel polymer is preferably trimellitic anhydride, since this compound is readily available and forms polymers having excellent physical properties of tensile strength and elongation and resistance to high temperatures.

A variety of operable alcohols can be used to esterify the tricarboxylic anhydride; for example, aliphatic alcohols having 1–18 carbon atoms, such as methanol, ethanol, n-propanol, iso-propanol, n-butanol isobutanol, the pentols, the hexanols, 2-ethylhexanol, isooctanol, nonanol, decanol, lauryl alcohol, cetyl alcohol and octadecyl alcohol. Cycloaliphatic alcohols are also useful, such as cyclopropanol, cyclobutanol, cyclopentanol, cyclohexanol, cycloheptanol, cyclooctanol and the like. Particularly useful are hydroxyl terminated aromatic compounds, such as phenol, cresol, xylenol, p-phenyl phenol, $a$ or $\beta$-naphthol and the like and aromatic alcohols. Useful aromatic alcohols are of the formula Ar—(CH$_2$)$_n$OH where $n$ is from 1–4 and Ar is a monovalent aromatic radical and are, for example, benzyl alcohol, 2-phenylethanol, 3-phenylethanol and 4-phenylbutanol.

The following are typical inert solvents which are used in the process of this invention to form the novel polymer: N-methylpyrrolidone, dimethylacetamide, dimethylformamide, hexamethylphosphoramide, dimethylsulfoxide, pyridine and the like.

The following organic diisocyanates are useful in the process of this invention for forming the novel polymer of this invention:

propylene-1,2-diisocyanate,
butylene-1,2-diisocyanate,
butylene-1,3-diisocyanate,
hexamethylene diisocyanate, and the like;
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanate, such as
methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate and the like,
methylene-bis-(4-phenyl isocyanate),
ethylene-bis-(4-phenyl isocyanate),
isopropylidene-bis-(4-phenyl isocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate,
2,2'-sulfonediphenyl diisocyanate,
3,3'-sulfonediphenyl diisocyanate,
4,4'-sulfonediphenyl diisocyanate,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate), and the like.

Preferred organic diisocyanates used to form the novel polymer of this invention are toluene diisocyanate, xylylene diisocyanate, n-phenylene diisocyanate, 4,4'-methene-bis-(4-phenyl isocyanate), 4,4'-methylene-bis-(cyclohexyl isocyanate) and hexamethylene diisocyanate.

After the novel polymer is formed by the process of this invention, it may be stored for later use or it may be used immediately to form shaped articles, as a coating composition or to form foamed structures. After the novel polymer is formed into shaped articles, e.g., a film, filament tube rod and the like, or applied as a coating or as an adhesive, or utilized in an enclosed area to form a foamed structure, it preferably is converted to its corresponding polyamide-imide. This is accomplished preferably by heating the polymer to about 150 to 400° C. for about 5 to 60 minutes, and more preferably, to about 175 to 300° C. for about 10 to 40 minutes. The resulting polyamide-imide has the following recurring structural units:

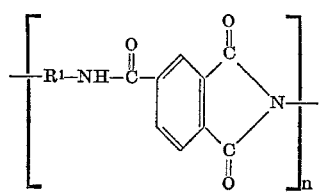

where $R^1$ is a divalent organic radical, and $n$ is an integer sufficiently high to provide an inherent viscosity at 25° C. of about 0.2–5 measured at about 0.5% polymer solids in a suitable solvent.

Inert materials may be added to solutions of the novel polymer of this invention, for example, pigments such as titanium dioxide, carbon black; metal particles, abrasives, and lubricating polymers. These materials are blended into the solution of the novel polymer composition using customary procedures such as ball milling, sand-grinding and the like. When used as a coating composition, the composition can be applied by the usual techniques, e.g., doctoring, rolling, dipping, flowcoating, brushing, spraying and the like, to a great variety of substrates, such as copper, brass, aluminum, steel and other metals in the form of sheets, wires or screens. The coatings of the novel polymer can also be applied to mineral structures, such as asbestos; to glass in the form of sheets, fibers or fabrics. The novel polymer of this invention can also be used as an adhesive composition and forms excellent adhesive bonds between such materials as metals, wood, polymeric materials and the like. The novel polymer can be used to form a high quality enamel for wires of copper, steel, aluminum and the like. The enamel compositions of the novel polymer can be applied by conventional wire coating techniques and equipment and gives a coating of excellent flexibility, good abrasion resistance and high dielectric strength.

The novel polymer can be made into a foam structure which is useful, for example, as a high temperature insulating material, to form laminates with a foam interior and the like. Sheets of foam can be formed that can be shaped into a variety of objects and can be utilized as a conventional foam sheet material.

The following examples illustrate this invention.

EXAMPLE 1

A polymer can be prepared by charging the following ingredients into a reaction vessel:

| | Parts by wt. |
|---|---|
| Methylisobutyl ketone (dried over a molecular sieve) | 200 |
| Trimellitic anhydride (dried at 150° C. for 1 hour) | 192 |
| N-butanol (dried over a molecular sieve) | 74 |
| Dimethylacetamide (redistilled and stored over a molecular sieve) | 100 |
| Toluene-2,4-diisocyanate | 174 |
| Total | 740 |

The trimellitic anhydride, N-butanol and methylisobutyl ketone solvent are charged into a reaction vessel equipped with a stirrer, condenser, dropping funnel and thermometer, and the ingredients are thoroughly mixed. The mixture is heated to its reflux temperature (130° C.) and held at this temperature and then cooled to room temperature. A portion of the reaction mixture is removed and analyzed by an infrared spectrophotometer which indicated that the mono-butyl ester of trimellitic acid was formed. The dimethyl acetamide solvent is added and the solution is throughly mixed. Toluene diisocyanate is slowly added over about a 10 minute period with constant agitation. The reaction mixture is then heated to its reflux temperature (120–136° C.) for about 10–20 minutes. The reaction mixture is then cooled to room temperature.

Infrared analysis will show that a poly(carbamic-anhydride amide-ester) is formed. The inherent viscosity of the polymer measured at 25° C. using a 0.5% solids solution in N-methyl pyrrolidone should be about 0.4–1.0. The polymer should have about 3 to 6% by weight of structure (I), 70 to 80% by weight of structure (II), 3 to 6% by weight of structure (III), and 3 to 6% by weight of structure (IV).

A film can be prepared from the polymer solution by casting a 5 mil thick wet film on a glass substrate and by drying this film at about 200° C. for about 20 minutes. The resulting polyamide–imide film is tough, durable and scratch resistant. A metal substrate is similarly coated with the polymer solution. The resulting coating is scratch resistant, flexible, and has good adhesion to the metal substrate. A copper wire is coated with the polymer solution using standard wire coating techniques. The coating on the wire has excellent flexibility, good abrasion resistance and has a high dielectric strength.

EXAMPLE 2

A polymer solution can be prepared by mixing in a reaction vessel, equipped as in Example 1, 1 mole of trimellitic anhydride with 1 mole of phenol and using methylisobutyl ketone as the solvent. The mixture is heated to its reflux temperature (120–140° C.) and held at this temperature for about 1 hour to form the phenyl ester of trimellitic acid. The mixture is cooled to room temperature and dimethyl acetamide solvent is added and mixed with the solution. About 1 mole of toluene-2,4-diisocyanate is then slowly added over about a 10 minute period with constant agitation. The reaction mixture is then heated to its reflux temperature and held at this temperature for about 10 to 20 minutes. The resulting poly(carbamic-anhydride-amide-ester) polymer solution should have an inherent viscosity at 25° C. using a 0.5% solids solution in N-methyl pyrrolidone of about 0.4 to 1.0. The polymer should contain about the same weight percentage of structures (I), (II), (III), and (IV) as in Example 1.

A film can be prepared from the polymer solution by casting a 5 mil thick wet film on a glass substrate and by drying this film at about 200° C. for about 20 minutes. The resulting polyamide-imide film should be tough, durable and scratch resistant. A metal substrate can be similarly coated with the polymer solution. The resulting coating should be scratch resistant, flexible and have good adhesion to the metal substrate. A copper wire can be coated with the polymer solution using standard wire coating techniques. The coating on the wire should have excellent flexibility, good abrasion resistance and have a high dielectric strength.

EXAMPLE 3

A poly(carbamic-anhydride-amide-ester) polymer solution can be prepared by mixing in a reaction vessel, equipped as in Example 1, 1 mole of trimellitic anhydride with 1 mole of cyclohexanol and using methylisobutyl ketone as the solvent. The mixture is heated to its reflux temperature and held at this temperature for about 1 hour to form the ester of trimellitic acid. The mixture is cooled to room temperature and dimethyl acetamide is added and mixed with the solution. About 1 mole of hexamethylene diisocyanate is then slowly added over about a 10 minute period with constant agitation. The reaction mixture is then heated to its reflux temperature and held at this temperature for about 10 to 20 minutes. The resulting polymer solution should have an inherent viscosity at 25° C. using a 0.5% polymer solids solution in N-methyl pyrrolidone of about 0.4 to 1.0. The polymer should contain about the same weight percentages of structures (I), (II), (III) and (IV) as in Example 1.

A film can be prepared from the polymer solution by casting a 5 mil thick wet film on a glass substrate and by drying this film at about 200° C. for about 20 minutes. The resulting polyamide-imide film should be tough, durable and scratch resistant. A metal substrate can be similarly coated with the polymer solution. The resulting coating should be scratch resistant, flexible and have good adhesion to the metal substrate. A copper wire can be coated with the polymer solution using standard wire coating techniques. The coating on the wire should have excellent flexibility, good abrasion resistance and have a high dielectric strength.

EXAMPLE 4

A foam structure can be prepared from the polymer solution of Example 1. The poly(carbamic-anhydride-amide-ester) solution of Example 1 is coated onto a metal panel at a thickness of about 20 mils. A second metal panel is bolted over the first panel leaving about ¼ inch space between the panels. The assembly is then placed in an oven and baked for about 20 minutes at 300° C. The assembly is removed and the plates separated. A foamed product should be formed that is rigid and stable up to 150° C. without collapse of the foam structure.

I claim:

1. A poly(carbamic-anhydride-amide-ester) polymer consisting essentially of recurring units of (I) 1 to 20% by weight of

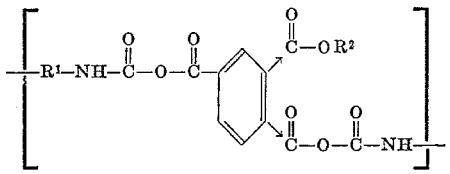

(II) 40 to 95% by weight of

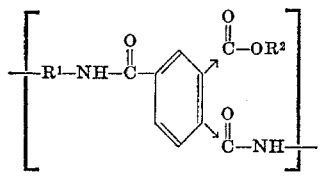

(III) 1 to 20% by weight of

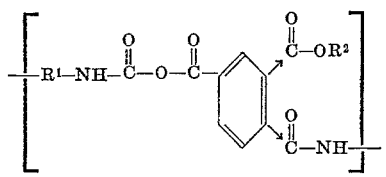

(IV) 1 to 20% by weight of

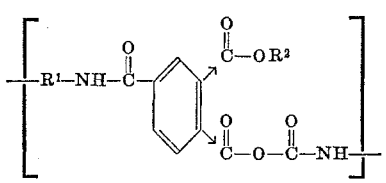

wherein the arrows denote isomerism; wherein $R^1$ is selected from the group consisting of an alkylene radical having 2-6 carbon atoms.

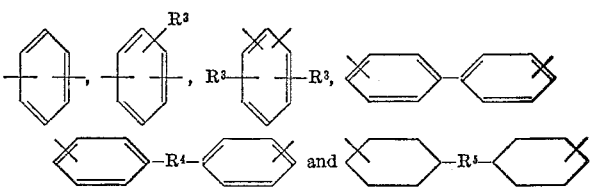

in which $R^3$ is an alkyl radical of 1–3 carbon atoms, $R^4$ is selected from the group consisting of an alkylene radical of 1–3 carbon atoms —O—, —S—, and —SO$_2$—, $R^5$ is an alkylene radical having 1–3 carbon atoms, $R^2$ is selected from the group consisting of an aryl radical, a cycloaliphatic radical and an alkyl radical having 1–18 carbon atoms; said polymer having an inherent viscosity at 25° C. of at least 0.15 to 4.0 measured at about 0.5% polymer solids in N-methyl pyrrolidone.

2. The polymer of claim 1 having an inherent viscosity of 0.5–2.0 measured at 0.5% polymer solids in N-methyl pyrrolidone and in which structural units (I), (II), (III) and (IV) are present in amounts of 3 to 10% by weight, 70 to 90% by weight, 3 to 10% by weight and 3 to 10% by weight, respectively.

3. The polymer of claim 1 in which $R^1$ is

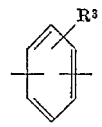

and $R^3$ is —CH$_3$ and $R^2$ is an alkyl radical of 2 to 10 carbon atoms.

4. The polymer of claim 1 in which $R^1$ is

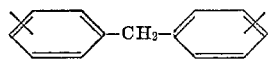

and $R^2$ is an alkyl radical of 2–10 carbon atoms.

5. The polymer of claim 1 in which $R^1$ is an alkylene radical having 6 carbon atoms and $R^2$ is cyclohexyl.

6. The process for making the polymer of claim 1 which comprises reacting the mono-ester of trimellitic anhydride of the formula

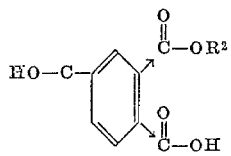

with an organic diisocyanate of the formula $R^6(NCO)_2$ at about 25 to 145° C. in an inert solvent for 0.1 to 1.9 hours; wherein $R^2$ is selected from the group consisting of an aryl radical, a cycloaliphatic radical and an alkyl radical having 1–18 carbon atoms; $R^6$ is selected from the group consisting of

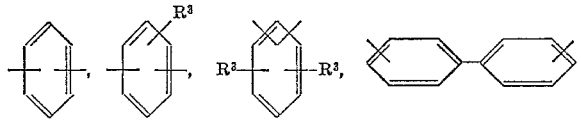

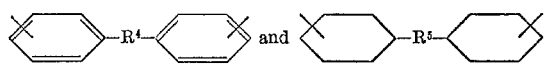

in which $R^3$ is an alkyl radical of 1–3 carbon atoms, $R^4$ is selected from the group consisting of an alkylene radical of 1–3 carbon atoms, —O—, —S—, and —SO$_2$—, and $R^5$ is an alkylene radical having 1–3 carbon atoms.

7. The process of claim 6 wherein $R^2$ is butyl and the organic diisocyanate is selected from the group consisting of toluene diisocyanate and methylene-bis-(4-phenyl isocyanate).

8. The process for converting the polymer of claim 1 into a polyamide-imide polymer which comprises heating the polymer of claim 1 to about 150 to 400° C.

9. A coating composition comprising the polymer of claim 1, and a solvent for the polymer.

10. A coated sheet material comprising a coalesced layer of the polymer of claim 1 in firm adherence to a flexible substrate.

11. A coated wire comprising a coalesced layer of the polymer of claim 1 in firm adherence to a wire.

References Cited

UNITED STATES PATENTS

| | | | |
|---|---|---|---|
| 3,300,420 | 1/1967 | Frey | 260—2.5 |
| 3,312,663 | 4/1967 | Sorenson | 260—47 |
| 3,314,923 | 4/1967 | Muller et al. | 260—78 |
| 3,489,696 | 1/1970 | Miller | 260—2.5 |

WILLIAM H. SHORT, Primary Examiner

LESTER L. LEE, Assistant Examiner

U.S. Cl. X.R.

117—123, 124, 128.4, 132; 260—2.5, 30.2, 30.6, 30.8, 32.6, 37, 47, 63